United States Patent Office 3,050,635
Patented Aug. 21, 1962

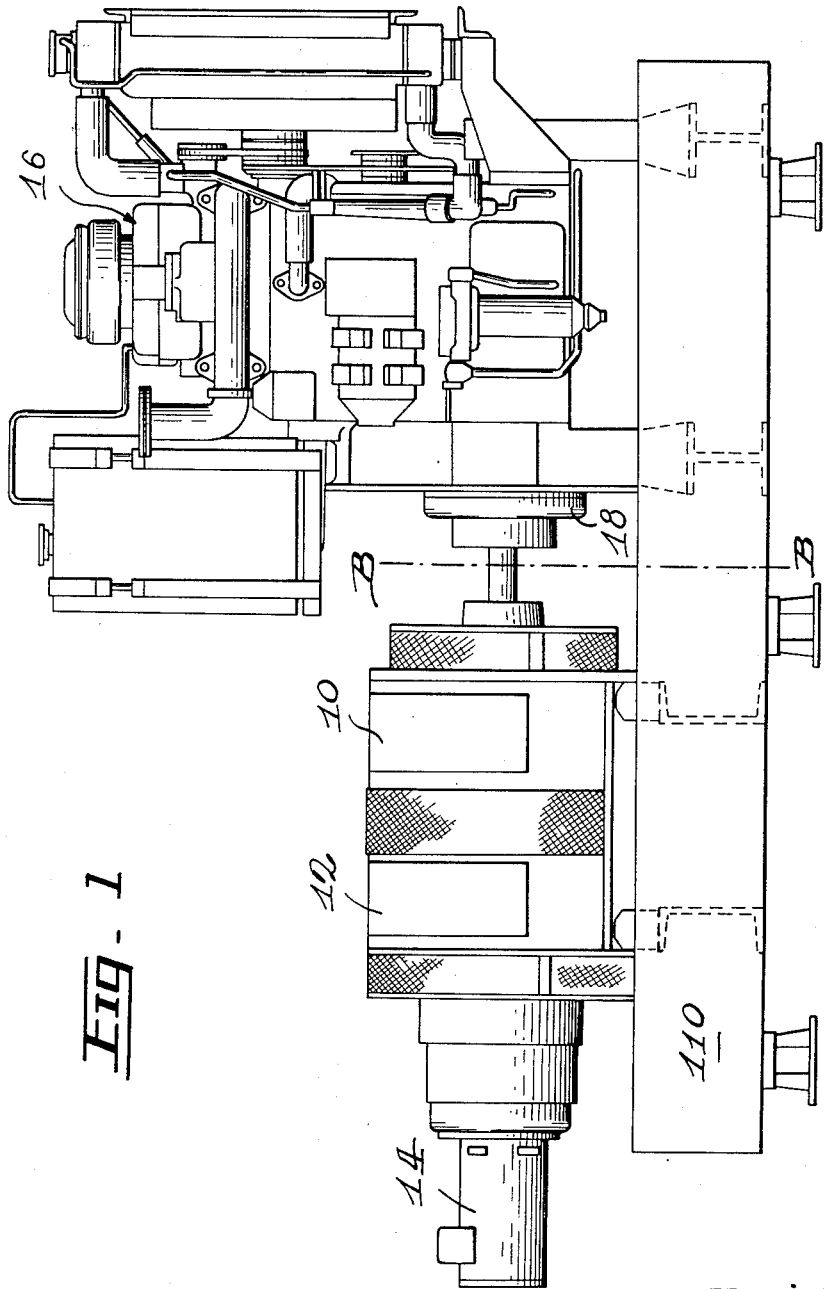

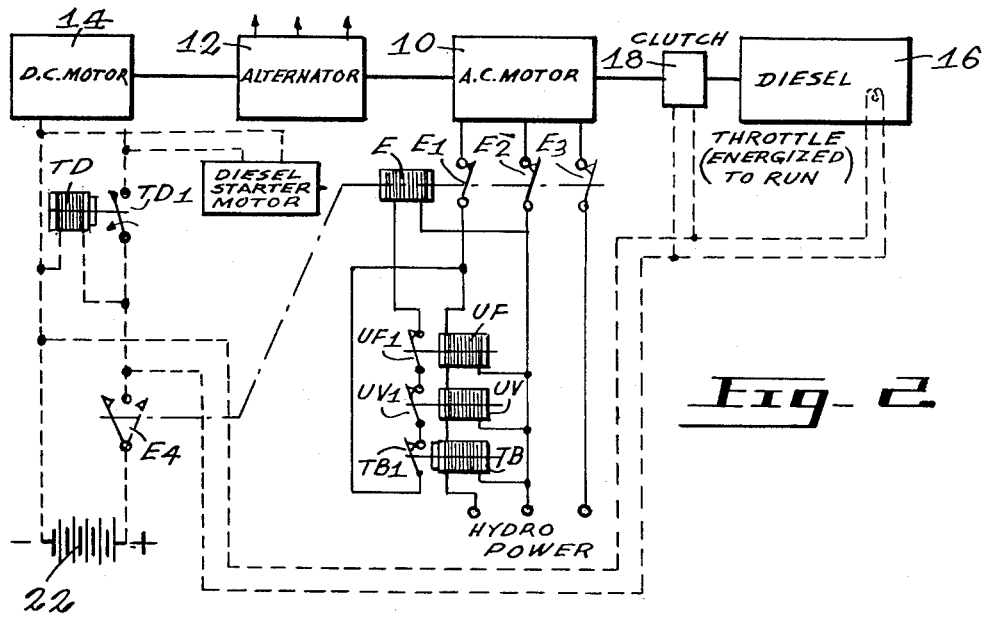
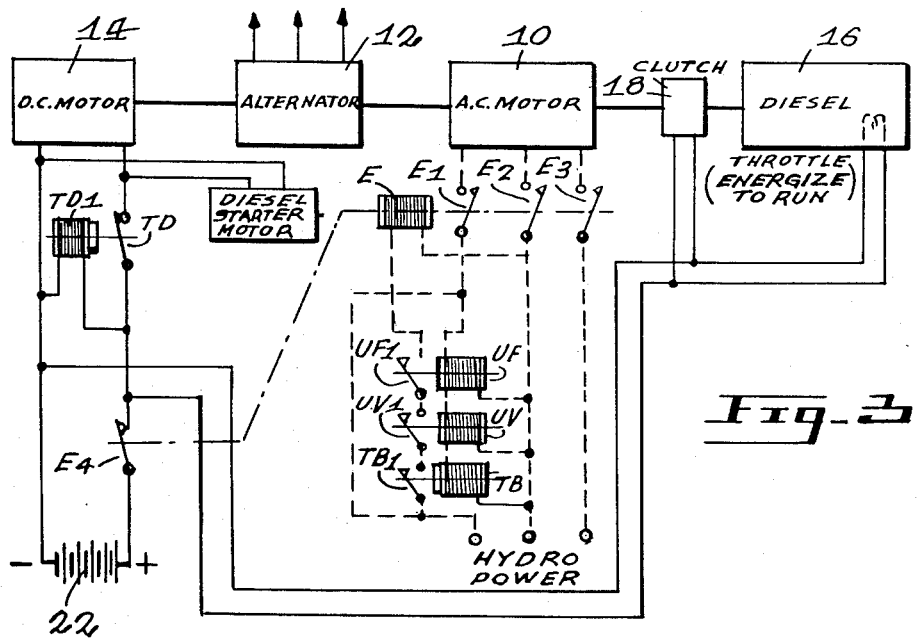

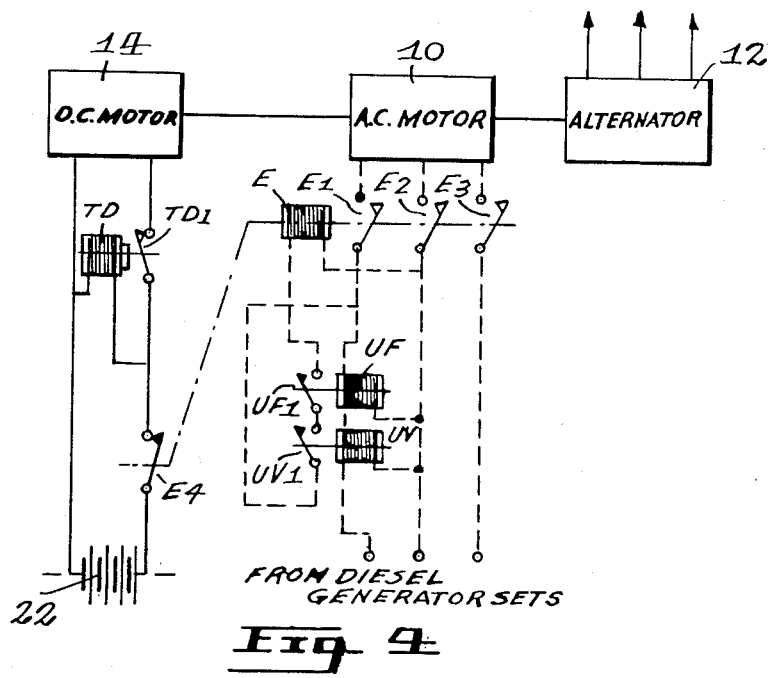

3,050,635
UNINTERRUPTED POWER SOURCES
Charles James Tanner, St. Laurent, Montreal, Quebec, Canada, assignor to Terry Machinery Company Limited, Montreal, Quebec, Canada
Filed Oct. 6, 1960, Ser. No. 60,836
5 Claims. (Cl. 307—64)

The present invention relates to improvements in A.C. generating equipment and more particularly to an improved apparatus capable of maintaining an uninterrupted power supply particularly suited for use with communication systems.

It is common practice in supplying A.C. power to systems of this nature to provide for an auxiliary or standby source of power to take over in the case of failure or reduction or change in voltage or frequency from the usual power lines. Necessarily, any such transition or changeover from the main power source to an auxiliary power source must be made almost instantaneously otherwise communication service will be interrupted. For example, in radio transmitting stations the equipment is such that a short A.C. failure will necessitate a stoppage of a greater duration than the actual power failure.

As in most cases the means of auxiliary power comprises a diesel engine or the like coupled to an A.C. generator, many forms of apparatus have been proposed for the starting of the engine and coupling in of the standby generator without appreciable loss of time.

One problem encountered in this desired rapid transition is that even with the most elaborate switching equipment there normally is a delay of from about ten to twenty seconds before the auxiliary equipment can take up the load. Various expedients have been proposed to overcome this problem; for example, flywheels have been embodied in A.C. motor-generator sets so that by inertia the A.C. generator speed is maintained until the auxiliary power is effective.

Further, in cases where communication equipment is to be set up in relatively remote areas the considerable added weight and bulk of a flywheel is a distinct disadvantage with regard to transportation.

The present invention aims to overcome these problems and disadvantages of the prior art equipment of this nature by providing an apparatus capable of maintaining an A.C. output to load constant during periods of transition of power supply to an A.C. motor-generator combination from a main A.C. supply source to an auxiliary power source on failure or instability of the main source. This is accomplished in accordance with the invention by connecting a constant speed D.C. motor directly to the A.C. motor-generator set so that it normally rotates with the A.C. motor-alternator and providing switching means whereby the D.C. motor is energized so as to continue to rotate the A.C. motor-generator for a relatively brief time period on the order of from about three to twelve seconds during which time the transition to auxiliary power is made.

In one preferred arrangement in accordance with the invention a diesel engine is provided as an auxiliary power source which is connected to the A.C. motor/A.C. generator set through a magnetic clutch. The D.C. motor is connected for common rotation with and in the same direction as the A.C. motor-generator set and storage batteries are connected to the D.C. motor with suitable automatic switching and time delay means between the usual A.C. power source, the A.C. motor-generator set and the D.C. motor.

With this arrangement, the A.C. motor normally turns the A.C. generator under power from the A.C. mains with the D.C. motor coasting and supplying no power. In the event of fluctuation or failure of the mains power, a contact immediately closes energizing the D.C. motor and closing the magnetic clutch. The D.C. motor thus continues to rotate the A.C. generator and A.C. motor and at the same time through the magnetic clutch assists in cranking the diesel engine. The D.C. motor is deenergized within a predetermined time delay period by the automatic switching means and the engine carries the load until the mains power is fully restored.

The general arrangement of A.C. motor/A.C. generator/D.C. motor interconnected for common rotation can also be utilized in installations where the main A.C. supply is provided by separate A.C. generating means, for example by two or more diesel generator sets where it is at times necessary to switch the load from one unit to another. In this case, the D.C. motor would be put into operation as described to maintain the rotation of the unit for a predetermined time period during the switch-over.

In one preferred construction the A.C. motor/A.C. generator/D.C. motor are mounted on a common shaft so as to present a complete compact unit within a single housing with the diesel engine also being mounted on the same base frame and in axial alignment with the generating set. This arrangement is particularly advantageous for use in and transportation to remote communication installations where bulk and weight are of prime consideration.

Having thus generally described the nature of the invention, particular reference will be made to the accompanying drawings showing by way of illustration a preferred embodiment thereof, and in which:

FIGURE 1 is a view in side elevation of an A.C. generating assembly having a diesel engine as auxiliary power and arranged in accordance with the invention.

FIGURE 2 is a schematic wiring diagram of the construction shown in FIGURE 1 showing the A.C. motor as being actuated from the A.C. mains with the engine idle, and FIGURE 3 is a schematic wiring diagram similar to FIGURE 2 showing the A.C. motor-generator assembly as being driven by the D.C. motor and cranking the diesel engine.

FIGURE 4 is a wiring diagram showing an alternative system utilizing two diesel generating sets in combination with the A.C. motor-generator/D.C. motor assembly of the invention without the auxiliary power unit connected thereto.

With particular reference to FIGURE 1 of the drawings, one preferred embodiment of the invention is shown as consisting of a base 110 on which there is mounted in axial alignment an A.C. motor 10, an A.C. generator or alternator 12, a D.C. motor 14 and a diesel engine 16 adapted to be engaged and disengaged from the motor 10 by a magnetic-type clutch 18.

With reference to FIGURE 2 this arrangement is shown in the condition where the power is obtained from the normal hydro or mains network with the power supply connected to the A.C. motor as shown. In this circuit the arrangement of relay coils UF (under frequency), UV (under voltage) and TB (timer) is adapted to control contact switches UF1, UV1, and TB1. When these coils are energized the switches UF1, UV1 and TB1 are closed so as to energize contact coil E closing the contacts E1, E2 and E3 while an auxiliary contact E4 connected to the circuit for the D.C. motor 14 is open. In this condition the A.C. motor is running from the mains supply driving the alternator 12 and the D.C. motor 14.

Upon failure or drops in voltage and/or frequency from the mains power supply, one or both of the relay coils UF, UV, will be de-energized and accordingly will open contacts UF1 and/or UV1. Hence the contactor coil E will also be de-energized and will open the main contacts E1, E2 and E3 disconnecting the mains power supply and at the same time closing the auxiliary contact E4. The closing of the contact E4 in the D.C. motor control circuit connects the battery 22 to the throttle D and starting motor of the diesel 16, and the magnetic clutch 18 and also energizes the coil of a time delay relay TD closing the contact TD1 connecting the D.C. motor 14. The diesel 16 being cranked by the D.C. motor 14 and its own starting motor will start and come up to speed.

With reference to FIGURE 3, the time delay relay TD after a predetermined time delay within a range of from about three to about twelve seconds will open the contact TD1 and thus disconnect the D.C. motor 14. The diesel 16 will take over and drive the whole system.

When the mains power is restored, the relay coils UF, UV and TB become energized, closing the contacts UF1 and UV1 but the time delay coil TB does not act to close the contact TB1 for a predetermined time delay period which will be from about ten minutes to about one hour. This is to permit the mains network to restore itself to even operation condition since immediately after a power failure fluctuations due to power demand are apt to occur. After the desired time delay the relay TB acts to close the contact TB1 to closed position, energizing the contactor coil E. With reference to FIGURE 4 the energizng of the coil E breaks the contact E4 breaking the connection to the magnetic clutch 18 and the diesel solenoid D and the normal operation is restored.

It will be appreciated by reference to the preceding description and accompanying drawings that while the preferred arrangement shown in FIGURES 1 to 3 has the main elements arranged as A.C. motor 10, A.C. generator or alternator 12, D.C. motor 14, this sequence could be varied to suit certain conditions. For example, the A.C. generator 12 could be disposed between the D.C. motor 14 and A.C. motor 10 with the magnetic clutch connected to the D.C. motor 14.

The alternate system shown in FIGURE 4 is for use in the case of main power obtained selectively from two diesel generating sets, the A.C. motor-generator/D.C. motor assembly having no auxiliary power connected directly therethrough, or in other words the assembly shown at the left-hand side of FIGURE 1 from the broken line B—B.

In this case, as mentioned, the primary A.C. power is obtained from one of the two generating sets (not illustrated) with provision made so that if one set should fail in any way the other immediately takes over. This can be done in a number of ways as is well known and it is not thought that any detailed description is necessary.

In normal operation, with power being supplied by one of the diesel sets, the circuit utilized in this alternative arrangement will be in the condition shown in FIGURE 1 with reference to the modifications shown in FIGURE 4. The relay coils UF, UV will be energized and the contacts UF1, UV1 closed energizng the contact coil E closing the contacts E1, E2, E3 so that the A.C. power is delivered to the A.C. motor 10.

If the operating diesel set should fail, and during the transition period when the power is off, the relay coils UF and UV will be de-energized and will open the contacts UF1 and UV1. Hence the contactor coil E will also be de-energized and open the main contacts E1, E2, E3 and at the same time close the auxiliary contact E4 energizing the coil of time delay relay TD closing the switch TD1 connecting the D.C. battery 22 to the D.C. motor 14.

The D.C. motor 14 will continue to run the system until the second diesel generating set is coupled in to restore the power. This power restoration will re-energize the coils UF and UV closing the contacts E1, E2, E3 and open the contact E4 to disconnect the battery 22 from the D.C. motor 14.

If for any reason the second generating set fails to start, the time delay relay TD, after a predetermined length of time, will open the contact TD1 and disconnect the D.C. motor from the battery.

It will be understood that suitable forms of auxiliary power other than these illustrated could be used to drive the A.C. motor-generator/D.C. motor combination of the invention in the case of failure of a main power supply without departing from the scope of the present invention.

I claim:

1. An apparatus for maintaining an A.C. output to load constant during periods of transition of power supply to an A.C. motor driving an A.C. generator from a first A.C. supply source to an auxiliary supply source on failure or variation of said first A.C. supply source, said first A.C. supply network being connected to said A.C. motor, comprising in combination, an auxiliary power source adapted to drive said A.C. motor, a constant speed D.C. motor connected for common rotation with and in the same direction as said A.C. motor and A.C. generator, storage batteries connected to said D.C. motor, and automatic switch means for energizing said D.C. motor from said storage batteries when the voltage or frequency of said first A.C. network supply drops below a predetermined value and simultaneously coupling in said auxiliary power source with said A.C. motor, whereby said D.C. motor acts to maintain the rotational speed of said A.C. generator and A.C. motor until said auxiliary power source acts to drive said A.C. motor and A.C. generator at said desired rotational speed maintaining said A.C. output, and further automatic means to de-energize said D.C. motor within a predetermined time delay period.

2. An apparatus as claimed in claim 1, wherein said auxiliary power source comprises a diesel engine and an auxiliary A.C. generator set and said automatic means includes switch means coupling the output of said auxiliary A.C. generator set to said A.C. motor upon variation of said first A.C. supply voltage.

3. An apparatus as claimed in claim 1, wherein said A.C. motor, A.C. generator and D.C. motor are mounted on a common axis and said auxiliary power source comprises a diesel engine also on a common axis with said A.C. motor, A.C. generator and D.C. motor with clutch means between said diesel engine and A.C. motor actuated by said automatic switch means.

4. An apparatus for maintaining an A.C. output to load constant during periods of transition of power supply to an A.C. motor driving an A.C. generator from a main A.C. supply source to an auxiliary power source on failure of said main supply source, comprising in combination a prime mover connected by a magnetic clutch to said A.C. motor, a main A.C. supply network connected to said A.C. motor, a D.C. motor connected for common rotation with and in the same direction as said A.C. motor and A.C. generator, storage batteries connected to said D.C. motor, and automatic switch means for energizing said D.C. motor from said storage batteries when the voltage or frequency of said A.C. network supply drops below a predetermined value and simultaneously energizing said magnetic clutch, whereby said D.C. motor acts to maintain the rotational speed of said A.C. generator and A.C. motor and cranks said prime mover, and further automatic switch means adapted to de-energize said D.C. motor within a predetermined time delay period.

5. An apparatus for maintaining an A.C. output to load constant during periods of transition of power supply to an A.C. motor driving an A.C. generator from a first A.C. supply source to a second A.C. supply source on failure or variation of said first A.C. source; comprising in combination with said A.C. motor and said A.C. generator, a D.C. motor mounted for common rotation with and in the same direction as said A.C. motor and A.C. generator, storage batteries connected to said D.C. motor, and automatic switching means between said first and second A.C. supply sources and said A.C. motor adapted to energize said D.C. motor from said storage batteries when the voltage or frequency of said first A.C. supply source connected to said A.C. motor drops below a predetermined value and simultaneously coupling in the second A.C. supply source to said A.C. motor, whereby said D.C. motor acts to maintain the rotational speed of said A.C. motor-generator set during the momentary lag of coupling in said second A.C. supply source, and further time controlled switching means to de-energize said D.C. motor within a predetermined time delay period.

References Cited in the file of this patent

UNITED STATES PATENTS 2,302,192     Dannheiser _____ Nov. 17, 1942